E. A. ASH.
TOOTH PASTE DISPENSING DEVICE.
APPLICATION FILED OCT. 31, 1912.
1,098,008.
Patented May 26, 1914.
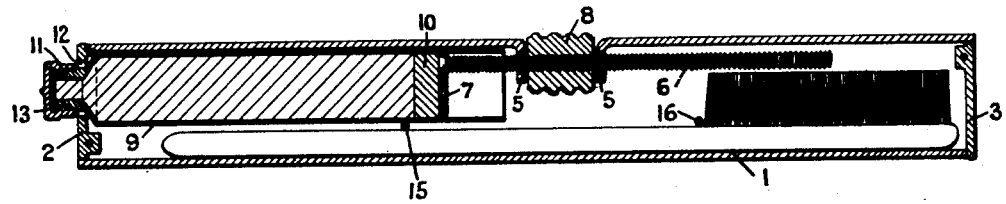
Fig. 1.
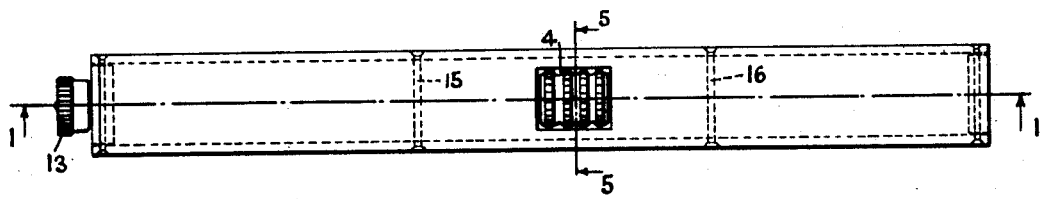
Fig. 2.
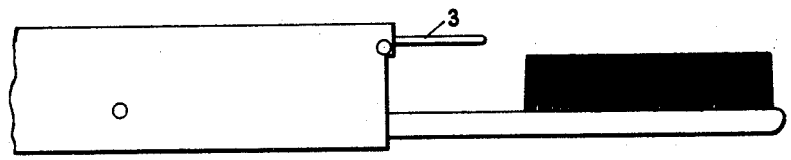
Fig. 3.
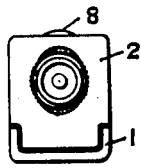 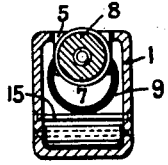 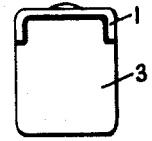
Fig. 4.    Fig. 5.    Fig. 6.
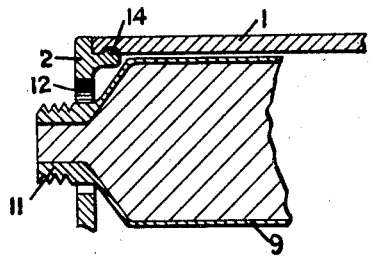
Fig. 7.
Witnesses:
Eric B. Kramer
Minnie S. Miller
Inventor
Ernest A. Ash
By his Attorney
Frank W. Ashley

UNITED STATES PATENT OFFICE.

ERNEST A. ASH, OF NEW YORK, N. Y.

TOOTH-PASTE-DISPENSING DEVICE.

1,098,008.  Specification of Letters Patent.  Patented May 26, 1914.

Application filed October 31, 1912. Serial No. 728,774.

*To all whom it may concern:*

Be it known that I, ERNEST A. ASH, a citizen of the United States, and a resident of New York, borough of Brooklyn, in the county of Kings and State of New York, have invented certain new and useful Improvements in Tooth-Paste-Dispensing Devices, of which the following is a specification.

This invention relates to tooth paste holders.

The principal object of this invention is to provide a tooth paste holder from which the tooth paste may be fed as required without removing the tooth paste tube from the holder.

Another object is to provide a device of this character in which the tube of paste may be easily and quickly inserted and from which it may be easily removed.

Further objects and advantages will appear from the detailed description and the claims.

In carrying out my invention, I provide an elongated casing in the interior of which is mounted a threaded rod carrying a thumb nut projecting from one side of the casing. A plunger or head is mounted on one end of this rod in position to engage the bottom of the tube which may be inserted through one end of the casing. The tube may be provided with a movable bottom which the plunger contacts and which it advances when the thumb nut is rotated to feed the paste. The cover may be formed with an aperture through which the mouth of the tube may project to the exterior of the casing, so that the cover need not be opened when it is desired to use the paste. The usual screw cap may be used to close the mouth of the tube. The cover of the casing may be provided with a spring catch and may serve as an abutment against which the tube is pressed by the action of the plunger in feeding the paste. The other end of the casing may be also provided with a cover and a brush may be inserted from that end into the interior of the casing and may be retained snugly in the space left between the screw rod and tube and the opposite wall.

In the accompanying drawing, Figure 1 is a longitudinal section through my improved holder illustrating the tube and brush retained therein. Fig. 2 is a plan view of Fig. 1. Fig. 3 is a fragmental view illustrating the brush as partly removed from the casing. Fig. 4 is an end view of Figs. 1 and 2 looking from the left. Fig. 5 is a section on line 5—5 of Fig. 2. Fig. 6 is an end view of Figs. 1 and 2 looking from the right. Fig. 7 is a detail of the spring catch for the cover.

The holder consists of a casing 1 having preferably hinged covers 2 and 3 at its ends. One side of the casing is formed with an aperture 4 bounded by two inturned lugs 5 through which extends loosely a screw threaded rod 6 having at one end a plunger or head 7, the latter being preferably fastened or attached to the rod eccentrically so as to properly register with the bottom of the tooth paste tube which is inserted in the casing. A thumb nut 8 is mounted on the rod within the aperture and extends slightly outward from the casing sufficiently so that it may be rotated by the thumb of the operator to advance the head. A tube 9 containing tooth paste may be inserted into the casing by opening the cover 2. This tube is preferably provided with a movable bottom 10 which is engaged by the head 7 to advance the same to feed the paste through the mouth of the tube 11. The mounting of the head 7 eccentrically upon the rod 6 also serves to prevent lost motion when the thumbnut is turned. For instance, if the head were not so mounted, and if the rod were to stick too tightly in the nut, the latter and the rod and head would all rotate simultaneously without advancing the paste in the tube. On the other hand, by having the head eccentrically mounted no such lost motion can occur, for if the rod were to stick in the nut it would simply involve the exercising of more force in turning the nut to advance the rod. The cover 2 is preferably provided with an aperture 12 through which the mouth 11 may pass and the cover may thus be snapped into place leaving the mouth 11 exposed and the latter may be closed by the usual cap 13. The aperture 12 is slightly elongated so as to facilitate its easy passage over the mouth 11 of the tube. The cover 2 may serve as an abutment to sustain the pressure exerted through the head 7 as it presses against the bottom 10 to feed the paste out from the tube.

Fig. 7 illustrates a detail of the spring catch which may be used for the cover 2. This catch may consist of a projection 14 which may snap into a suitably placed notch in the casing. The space left in the casing is bounded by the screw rod 6, the tooth paste tube and the opposite side of the casing and is proportioned for the reception of a tooth brush, the latter being inserted through the end of the casing provided with the hinged cover 3. Pins 15 and 16 may extend transversely through the casing to form a guide for the handle of the brush to properly hold the latter in position and prevent it from rattling.

It will thus be seen that I have provided a tooth paste holder which is neat and compact and out of which the tooth paste may be fed without removing the tube from the holder. The tube may be readily inserted within the holder and is retained in position simply and efficiently by the cover itself. The paste may be fed by the operator as the latter grasps the casing by a simple movement of the thumb, thus facilitating the ease with which the tooth paste is fed. The device is efficient, attractive and recommends itself especially to travelers by reason of its compactness, simplicity and the ease with which it may be operated to feed the tooth paste. The casing may be made up of any desired material as celluloid, sheet metal, etc.

Having thus described my invention, I claim—

1. In a device of the character described, a casing, a threaded rod mounted in the interior thereof, said rod having a head at one end, a thumb nut mounted on the rod and located partly within and partly exteriorly of the casing at a longitudinal side thereof, a tube having a movable bottom actuated by the rod, and a cover for the casing through which the mouth of the tube projects.

2. In a device of the character described, a casing having an aperture at one side thereof, inturned lugs at each side of the aperture, a tooth paste tube having a movable bottom inserted within the casing, a screw-threaded rod mounted in the interior of the casing and loosely passing through said lugs, a thumb nut mounted on the rod, a head formed at one end of the rod, said head adapted to operate the movable bottom of the tooth paste tube to feed the paste therefrom.

3. In a device of the character described, a casing, a tooth paste tube within the casing and having a movable portion, a screw-threaded rod mounted within the casing, a head mounted eccentrically on one end of the rod, and means extending exteriorly through the casing for actuating the head to operate the movable portion of the tube to feed its contents to a point exteriorly of the casing.

4. In a device of the character described, a casing having an aperture at one side thereof, a screw-threaded rod mounted within the casing adjacent the apertured side, a head mounted on one end of the rod, a tooth paste tube inserted within the casing and having a movable bottom, said head engaging the bottom of the tube, and a thumb nut mounted on said rod, the main portion of the nut being located within the casing and a portion thereof extending through the aperture for operating the movable portion of the tooth paste tube.

Signed at New York city, in the county of New York and State of New York, this 30th day of October A. D. 1912.

ERNEST A. ASH.

Witnesses:
EUGENE L. LARKIN,
FRANK M. ASHLEY.